United States Patent [19]
Pursel

[11] 3,797,212
[45] Mar. 19, 1974

[54] COMBINATION MOWING-MULCHING APPARATUS

[76] Inventor: Oden A. Pursel, 918 Ext. E. 8th St., Bloomsburg, Pa. 17815

[22] Filed: Mar. 26, 1973

[21] Appl. No.: 344,955

[52] U.S. Cl. ............................................. 56/255
[51] Int. Cl. ........................................... A01d 35/26
[58] Field of Search ........ 56/255, 295, 320.1, 320.2

[56] References Cited
UNITED STATES PATENTS

| | | | |
|---|---|---|---|
| 3,242,660 | 3/1966 | Gary | 56/255 X |
| 3,538,692 | 11/1970 | Cope et al. | 56/295 |
| 2,836,024 | 5/1958 | Davis et al. | 56/255 X |
| 2,968,354 | 1/1961 | Berry | 56/295 X |

*Primary Examiner*—Robert Peshock
*Assistant Examiner*—J. A. Oliff
*Attorney, Agent, or Firm*—John A. Mihalik, Esq.

[57] ABSTRACT

A combination mowing-mulching apparatus in which a generally cylindrical skirt, including at least two sets of fixed mulching blades, are arranged between the cutting blade of a lawnmower and the underside of the housing, concentric with the drive shaft connecting the cutting blade to a prime mower.

7 Claims, 3 Drawing Figures

PATENTED MAR 19 1974

COMBINATION MOWING-MULCHING APPARATUS

BACKGROUND OF THE INVENTION

This invention relates to mowing apparatus in general, and to a combination mowing-mulching apparatus in particular.

Most known mowing machines do not combine a mulching operation with a mowing operation. Consequently if it is desired to dispose of mowed vegetation, it is necessary to employ a cumbersome attachment such as a canvas bag connected to the mower to gather the vegetation or to employ a separate raking-bagging operation, which is both time consuming and exhausting.

In addition, at times it is often desired to dispose of vegetation, in an efficient manner, which has settled on a lawn such as fallen leaves. Most known apparatus employ a sweeping technique which deposits the leaves in a canvas bag.

Those mowing machines which do combine a mulching operation are often ineffective because they are easily clogged or because they do not thoroughly disintegrate the vegetation.

SUMMARY OF THE INVENTION

Accordingly, one object of this invention is to provide an apparatus for simultaneously mowing and mulching vegetation in an efficient manner.

Another object of this invention is to provide an apparatus for mulching deposited vegetation in an efficient manner.

A further object of this invention is to provide a mowing-mulching apparatus, which can be obtained by adapting a conventional lawn mower.

The above objects are attained by locating a mulching skirt having two sets of fixed mulching blades between the rotatable cutting blade and the underside of the housing of a conventional rotary lawn mower. As the rotatable cutting blade is driven by a driving means attached to the housing, the mowed vegetation or fallen leaves, is forced into contact with the mulching blades where the vegetation is disintegrated.

DETAILED DESCRIPTION OF PREFERRED EMBODIMENT

Figure 1:
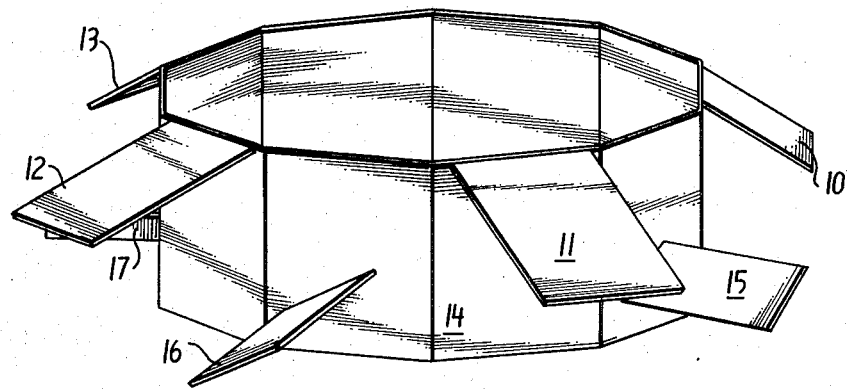
FIG. 1 is a perspective view of the mulching skirt and the fixed mulching blades of the present invention.

Referring to FIG. 1, a first set of fixed mulching blades, including individual mulching blades 10, 11, 12, and 13, is arranged around the outside of a generally cylindrical mulching skirt, 14. Each of the individual mulching blades 10 through 13, extends outwardly from the mulching skirt, 14. Similarly, a second set of fixed mulching blades includes individual mulching blades 15, 16, and 17. The second set of mulching blades is spaced downwardly on the skirt 14, from the first set of mulching blades and extends outwardly from skirt, 14.

While FIG. 1 shows only four blades in the first set and three blades in the second set, it should be understood that in the preferred embodiment the individual mulching blades are arranged symmetrically around the circumference of the mulching skirt, 14.

The individual mulching blades may be fixed individually to the mulching skirt 14, by any suitable method, although it is preferred that the mulching skirt and individual mulching blades be formed from one piece of sheet metal.

The preferred embodiment employs two sets of mulching blades since it is believed that the second set, in addition to disintegrating the vegetation, breaks up the flow of vegetation and enables the first set of mulching blades to be more effective. It should also be understood that the apparatus of the present invention will be operable with any number of individual mulching blades so long as there are cutting edges exposed. An arrangement of seventeen blades in the first set and five blades in the second set was found to be very effective.

Figure 2:
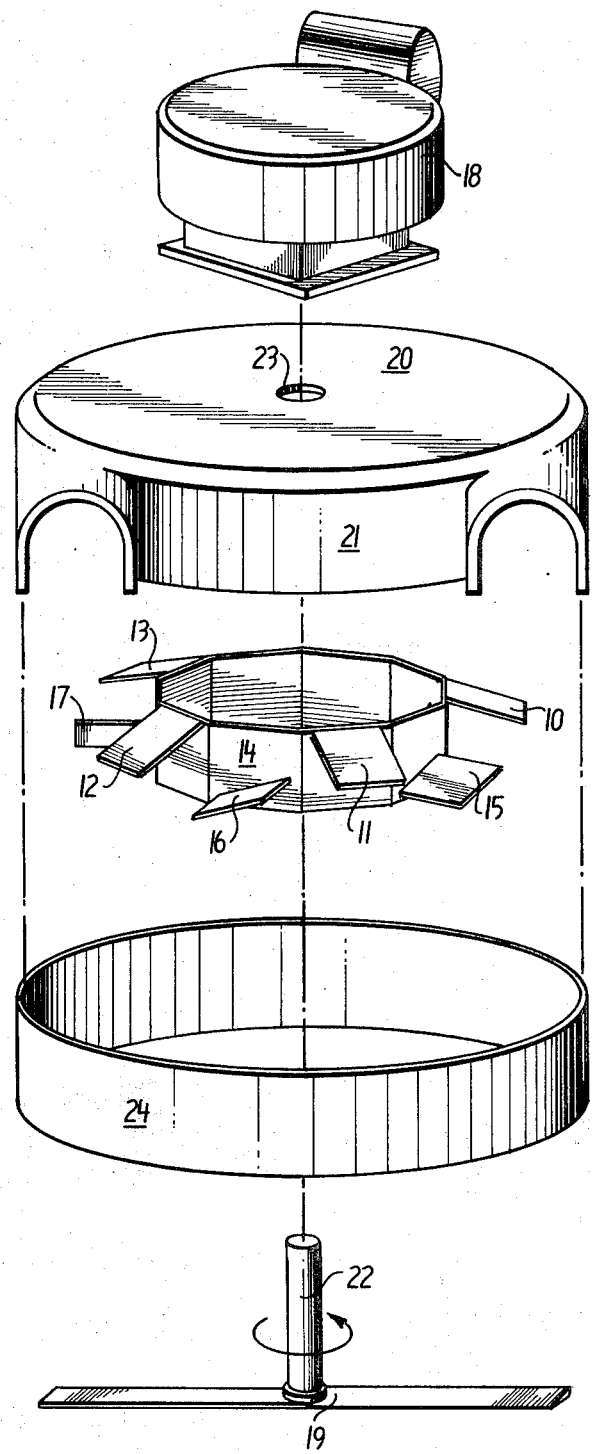
FIG. 2 is a perspective view of the mulching skirt arrangement of FIG. 1 in combination with a mowing apparatus.

FIG. 2 shows the mulching skirt of FIG. 1 in combination with a conventional mowing apparatus. A prime mover 18, which acts as a means for driving a cutter 19, is shown fixed to the top surface 20 of a housing 21. A drive shaft 22, is coupled to the prime mover 18 and extends through aperture 23 in the top surface 20 of the housing 21. The drive shaft 22, is operatively coupled to a rotatable cutter 19. The mulching skirt 14, which was more thoroughly described in FIG. 1, is shown located between the cutter 19, and the underside of the top surface 20 of the housing 21.

The mulching skirt 14, is fixed to the underside of the top surface 20 of the housing 21, by any suitable means. One workable method is to provide holes in a number of individual mulching blades of the first set of mulching blades and bolt the mulching skirt to the housing. If it is desired to remove the mulching skirt, it is necessary only to remove the bolts and the cutting blade.

A cylindrical baffle 24, which is concentric with the drive shaft 22, and the mulching skirt 14, and extends from the underside of the housing 21 to beneath the cutting blade 19, is provided to increase the efficiency of the mowing-mulching apparatus of the present invention. When the baffle 24, is in place, vegetation which is picked up by the cutting blade is prevented from being deposited in the corners of the housing 21 or being discharged without being disintegrated.

While a discharge port is not shown in the baffle 24, it should be understood that one should be provided to match up with the discharge port of a conventional lawn mower housing.

The apparatus described in FIG. 2 works in this manner; the rotatable cutter 19, is driven by drive shaft 22 and prime mover 18. As it rotates in the direction shown in FIG. 2, it cuts vegetation and picks up other vegetation such as dead leaves or twigs, and forces it in contact with the first set of individual mulching blades, 10, 11, 12 and 13.

Figure 3:
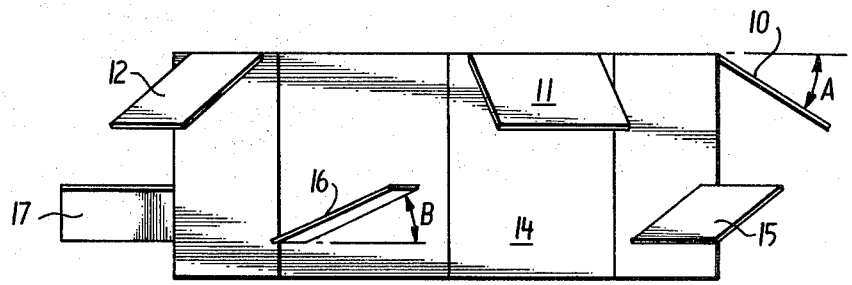
FIG. 3 is a side view of the mulching skirt showing a preferred arrangement of the individual mulching blades.

As more fully described in FIG. 3, the individual mulching blades 15, 16, and 17 of the second set of mulching blades, are inclined so that when vegetation is forced against them a portion of the vegetation is disintegrated and the remaining portion is passed to the blades 10, 11, and 12, in the first set of mulching blades, where it is completely disintegrated and discharged by the force of the cutter, 19.

FIG. 3 shows the position of the individual mulching blades in a preferred embodiment of the invention. The individual mulching blades 10, 11, and 12, (13 not shown) of the first set of fixed mulching blades are shown fixed to the mulching skirt 14, and inclined downwardly from said skirt with respect to the underside of the top surface 20, of the housing 21, at an angle A.

The individual mulching blades 15, 16 and 17 of the second set of mulching blades are shown spaced from the first set of mulching blades. Their edges, furthest from the skirt 14, are inclined at an angle B, relative to the top surface 20, of the housing 21.

The direction of inclination in the second set of mulching blades 15, 16, and 17 is a function of the direction of rotation of the cutter, 19. As shown in FIG. 2 in this embodiment, the cutter 19, rotates in a counter-clockwise direction. Accordingly, the blades 15, 16, and 17 of the second set of mulching blades are inclined from left to right so the vegetation can be passed to the first set of mulching blades as shown in FIG. 3.

As various changes could be made in the above constructions without departing from the scope of the invention, it is intended that all matter contained in the above description as shown in the accompanying drawings should be interpreted as illustrative and not in a limiting sense.

What is claimed and desired to be secured by letters Patent of the United States is:

1. A mowing and mulching apparatus comprising:
    a. a housing having at least a top surface, said top surface having an aperture;
    b. a rotatable cutter located beneath said top surface for cutting vegetation;
    c. a prime mover attached to said housing and having a drive shaft extending through said aperture for rotating said cutter, and;
    d. a generally cylindrical skirt, attached to said housing, generally concentric with said drive shaft and located between said cutter and the underside of said top surface, said skirt including:
        i. a first set of mulching blades including a plurality of individual mulching blades arranged around said skirt, each individual mulching blade being inclined downwardly from said skirt relative to the underside of said top surface, and extending radially outwardly from said skirt, and;
        ii. a second set of mulching blades spaced downwardly from said first set of mulching blades, said second set of mulching blades including a plurality of individual mulching blades arranged around said skirt, the edge of each individual mulching blade furthest from said skirt being inclined at an angle relative to said top surface and extending radially outwardly from said skirt for disrupting the flow of said vegetation.

2. The mowing and mulching apparatus as recited in claim 1 wherein a generally cylindrical baffle depends from said housing and is concentric with said skirt and outwardly spaced from said mulching blades.

3. A mowing and mulching apparatus comprising:
    a. a housing having at least a top surface; said top surface having an aperture;
    b. a rotatable cutter located beneath said top surface of said housing for cutting vegetation;
    c. means attached to said housing having a drive shaft extending through said aperture for rotating said cutter, and;
    d. a generally cylindrical skirt attached to said housing generally concentric with said drive shaft and located between said cutter and the underside of said top surface of said housing, said skirt including;
        i. a first set of mulching blades including a plurality of individual mulching blades arranged around said cylindrical skirt and extending radially outwardly from said skirt, and;
        ii. a second set of mulching blades downwardly spaced from said first set of mulching blades including a plurality of individual mulching blades arranged around said cylindrical skirt, and extending radially outwardly from said skirt for disrupting the flow of said vegetation.

4. The mowing and mulching apparatus as recited in claim 3 wherein the individual mulching blades in said first set of mulching blades are downwardly inclined from said cylindrical skirt, relative to said top surface of said housing.

5. The mowing and mulching apparatus as recited in claim 3 wherein the edge, furthest from said skirt, of each individual mulching blade in said second set of mulching blades is inclined at an angle relative to the top surface of said housing.

6. The mowing and mulching apparatus as recited in claim 3 wherein a generally cylindrical baffle depends from said housing and is concentric with said skirt and outwardly spaced from said mulching blades.

7. A mowing and mulching apparatus comprising:
    a. a housing having at least a top surface;
    b. a rotatable cutter located beneath said top surface for cutting vegetation;
    c. means attached to said housing for driving said cutter, and;
    d. a generally cylindrical skirt attached to said housing, located between said cutter and the underside of said top surface, said skirt including:
        i. a first set of mulching blades containing at least one individual mulching blade extending radially outwardly from said skirt, and;
        ii. a second set of mulching blades, downwardly spaced from said first set of mulching blades, containing at least one individual mulching blade extending radially outwardly from said skirt for disrupting the flow of said vegetation.

* * * * *